United States Patent [19]

Lanier

[11] Patent Number: 5,383,061
[45] Date of Patent: Jan. 17, 1995

[54] REARVIEW MIRROR APPARATUS FOR HUNTERS

[76] Inventor: John T. Lanier, P.O. Box 773, Blowing Rock, N.C. 28605

[21] Appl. No.: 50,505

[22] Filed: Apr. 20, 1993

[51] Int. Cl.⁶ .......................... G02B 7/18; A47G 1/24
[52] U.S. Cl. ..................... 359/872; 248/484; 248/216.1; 248/216.4; 248/276; 43/1
[58] Field of Search ............. 248/216.1, 216.4, 288.5, 248/481, 482, 276, 282, 284, 287, 288.3, 475.1, 479, 484, 485, 486, 487, 278; 359/871, 872; 43/1

[56] References Cited

U.S. PATENT DOCUMENTS

| | | | |
|---|---|---|---|
| 1,202,518 | 10/1916 | Henwood | 248/288.5 |
| 1,222,417 | 4/1917 | Kreher | 248/216.1 |
| 1,448,024 | 3/1923 | Brizgis | 248/476 |
| 1,646,379 | 10/1927 | Whitehead | 248/481 |
| 1,757,280 | 5/1930 | Withrow | 248/475.1 |
| 2,012,941 | 9/1935 | Corron et al. | 248/288.5 |
| 3,131,251 | 4/1964 | Ryan | 248/475.1 |
| 3,427,095 | 2/1969 | Dykema et al. | 248/467 |
| 4,004,850 | 1/1977 | Nelson . | |
| 4,487,479 | 12/1984 | Tolomeo, Sr. . | |
| 4,750,811 | 6/1988 | Beyer . | |

*Primary Examiner*—Ricky D. Shafer
*Attorney, Agent, or Firm*—Shefte, Pinckney & Sawyer

[57] ABSTRACT

A rearview mirror apparatus for use by hunters while seated in a tree stand facing a tree trunk, includes a mirror attached to a mounting arm assembly having a spike for removably penetrating the tree trunk for selective mounting thereto and demounting therefrom in a viewing position forwardly of the tree stand seat to provide a hunter with a reflected rearward field of view from a stationary seated position facing the tree trunk. Preferably, the arm assembly includes a jointed arm portion providing at least one ball-and-socket joint by which the viewing field of the mirror may be selectively adjusted.

2 Claims, 2 Drawing Sheets

REARVIEW MIRROR APPARATUS FOR HUNTERS

BACKGROUND OF THE INVENTION

The present invention relates generally to hunting devices and apparatus and, more particularly, to accessories for use by hunters while seated in a so-called "tree stand".

A tree stand is an apparatus which enables a hunter to climb a tree, pole, or the like to an elevated disposition at which the hunter can remain seated at a vantage point providing him or her with a relatively wide field of view of the surrounding area for the particular type of wild game being hunted. Differing types of tree stands enable the hunter to be seated facing either toward or away from the tree or pole, the present invention relating specifically to the former. As will be understood, it is extremely important when wild game approaches a hunter that he or she remain quiet and stationary so as not to be detected by the animal, which poses a particular disadvantage to hunters in a tree stand when wild game approaches from the hunter's rear. If a hunter who detects the rearward approach of wild game turns to face the animal, the hunter risks being detected and frightening the animal before the hunter can assume a balanced shooting position.

SUMMARY OF THE INVENTION

It is accordingly an object of the present invention to provide a rearview mirror apparatus which hunters can utilize while seated in a tree stand to obtain a reflected rearward field of view to enable the hunter to visually monitor the rearward approach of wild game without risk of frightening the animal prematurely.

Briefly summarized, the rearview mirror apparatus of the present invention basically comprises a mirror and a mounting arm assembly attached to the mirror for mounting to a tree trunk. Specifically, the mounting arm assembly includes a device for removably penetrating the tree trunk for selective mounting to and demounting from the tree trunk in a viewing position forwardly of the tree stand seat to provide a hunter with a reflected field of view rearwardly of the seat from a stationary position seated in the seat facing the tree trunk.

In the preferred embodiment of the present rearview mirror apparatus, the mounting arm assembly includes a threaded spike for rotational penetration of and withdrawal from the tree trunk and a handle portion attached to the spike for driving rotation of the spike during penetration and withdrawal from the tree trunk. The mounting arm assembly further includes a joint device pivotably connecting the handle portion to the mirror for selective adjusting movement of the mirror relative to the handle portion. Preferably, the mirror and joint device are selectively detachable as a unit from the handle portion to facilitate mounting and demounting of the handle portion and the spike as a unit to and from the tree trunk. It is also preferred that the joint device include a first pivotable joint between the joint device and handle portion and a second pivotable joint between the joint device and mirror.

DESCRIPTION OF THE PREFERRED EMBODIMENT

Figure 1:
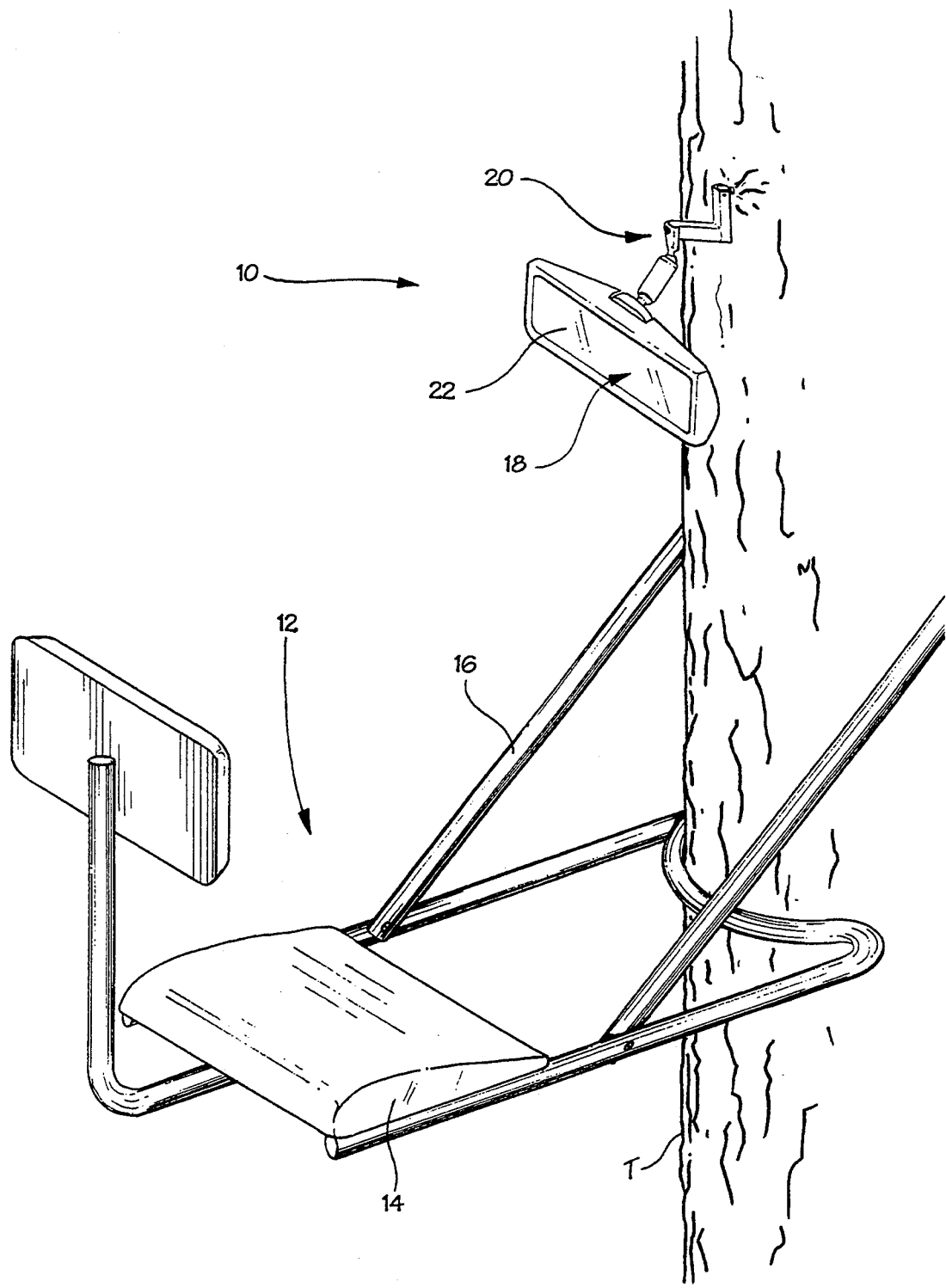
FIG. 1 is a perspective view showing the rearview mirror apparatus of the present invention in normal use mounted to a tree trunk forwardly of a tree stand.

Referring now to the accompanying drawings and initially to FIG. 1, the rearview mirror apparatus of the present invention is generally indicated at 10 in its normal use disposition, more fully described below, mounted to a tree trunk, pole, or other columnar structure T forwardly of and slightly elevated above a tree stand, generally indicated at 12 situated on the tree trunk T.

The tree stand 12 is of the conventional type having a seat structure 14 affixed rigidly to a frame 16 which encircles the tree trunk T to enable the hunter to climb the tree trunk T to a desired elevated disposition and then to be seated on the seat structure 14 at such elevation, the weight of the hunter acting through the seat structure 14 and the frame 16 to brace the tree stand 12 securely to the tree trunk T. In such disposition, the seat structure 14 of the tree stand faces the tree trunk T so that the hunter, while seated, also faces the tree trunk T. As will be understood, the tree stand 12 forms no part of the present invention and is depicted merely as being representative of the type of tree stand with which the rearview mirror apparatus 10 of the present invention may be utilized.

Figure 2:
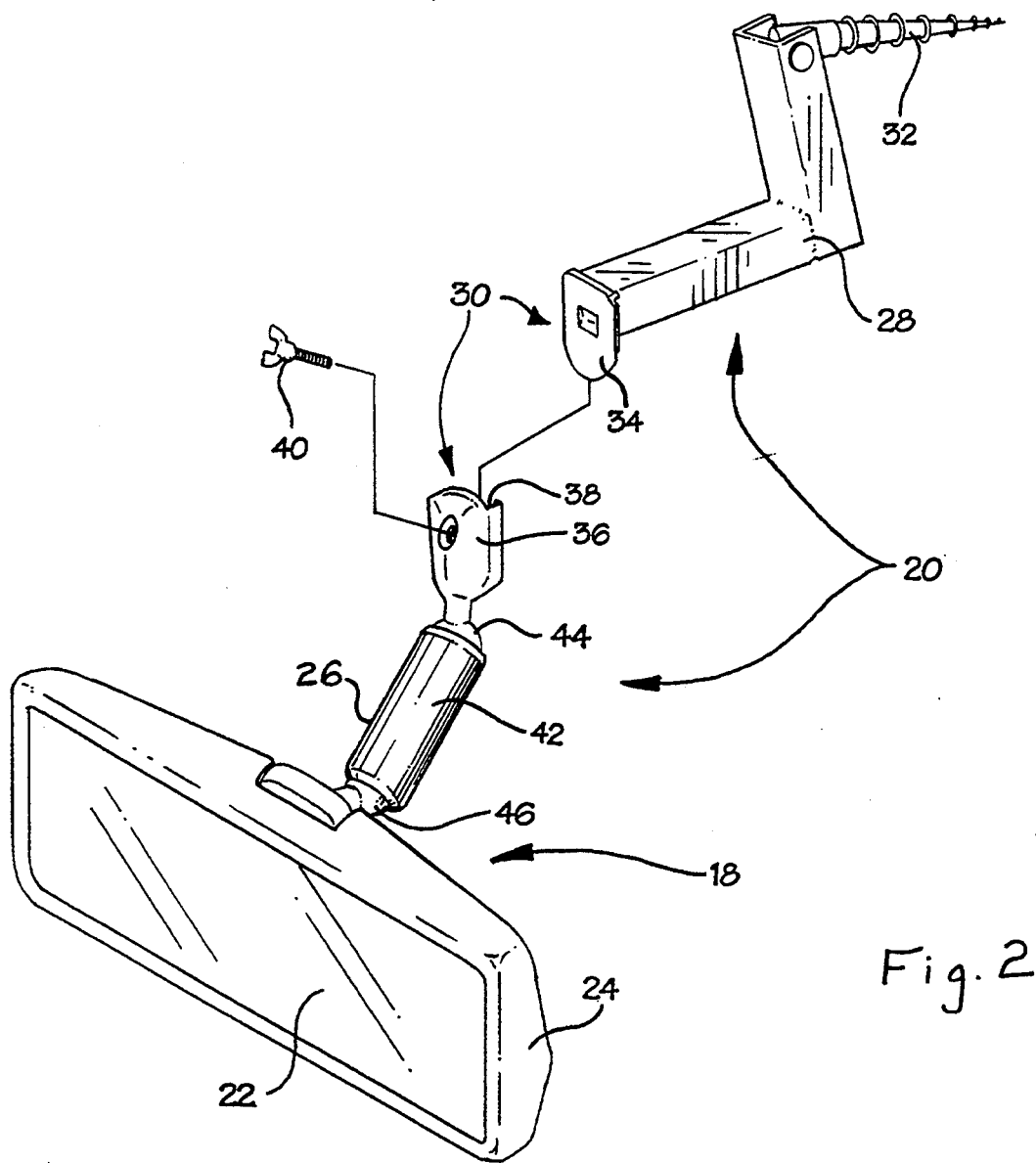
FIG. 2 is an exploded perspective view of the rearview mirror apparatus of FIG. 1.

With additional reference to FIG. 2, the rearview mirror apparatus 10 of the present invention basically includes a mirror assembly 18 attached to a mounting arm assembly 20. The mirror assembly 18 includes a conventional mirror 22 of any desired shape and size, preferably mounted within a protective casing 24. The mounting arm assembly 20 includes a pivotable joint device 26 affixed to the rearward size of the mirror casing 24, an L-shaped handle portion 28 attached to the joint device 26 by a detachable connection 30, and a threaded spike pivotably affixed to the opposite end of the handle portion 28.

The L-shaped handle portion 28 and the threaded spike 32, as a unit, are in the form of a conventional "tree step" commonly used by hunters as a means of climbing to an elevated position within a tree without the use of a tree stand. The threaded spike is pivotably movable between a storage position housed within the adjacent leg of the L-shaped handle portion 28 and a use position extending outwardly therefrom wherein the spike can be driven by the handle portion 28 to threadedly penetrate the tree trunk T. The connection 30 includes a flange 34 affixed to the end of the handle portion 28 opposite the spike 32 and a bracket 36 affixed to one end of the joint device 26 and forming a rearward channel 38 configured for mated sliding receipt of the flange 34. A thumb screw 40 extends through the bracket 36 to selectively secure or release the flange 34 within the channel 38. The joint device 26 includes a central linear arm portion 42 with a first ball-and-socket joint 44 connecting one end of the arm portion 42 pivotably to the connection bracket 36 and a second ball-and-socket joint 46 connecting the other end of the arm portion 42 pivotably to the rearward side of the mirror casing 24.

The operation and use of the rearview mirror apparatus 10 may thus be understood. After a hunter has climbed the tree trunk T to a desired elevation using the tree stand 12, the hunter situates himself or herself on the seat structure 14 facing the tree trunk and visually chooses an appropriate location on the tree trunk T slightly above eye level for placement of the mirror apparatus 10. With the handle portion-spike unit 28,32 disconnected from the joint device 26, the spike 32 is extended from the handle portion 28 and, using the handle portion 28, the hunter manually drives the spike 32 into the tree trunk T at the selected location until the handle portion 28 is well-secured. The connection bracket 36 is then attached to the flange 34 at the outward end of the handle portion 28 and secured by the thumb screw 40. Using the two ball-and-socket joints 44,46 of the joint device 26, the hunter can then maneuver and orient the mirror 22 to provide the hunter with any desired field of view rearwardly behind the tree stand 12. Thus, if wild game approaches the hunter from the rear, the hunter will be enabled to visually follow the animal's movement through the mirror 22 and is thereby enabled to select the most appropriate time to turn toward the animal to aim and shoot.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A rearview mirror apparatus for use by hunters while seated in a tree stand disposed in an elevated disposition on a tree trunk wherein the tree stand has a seat facing the tree trunk, the mirror apparatus comprising a mirror and a mounting arm assembly attached to said mirror, said mounting arm assembly including a threaded spike and a handle portion attached to said spike for driving manual rotational penetration of the tree trunk by said spike and rotational withdrawal from the tree trunk of said spike for selective mounting to and demounting from the tree trunk in a viewing position forwardly of the tree stand seat to provide a hunter with a reflected field of view rearwardly of the seat from a stationary position seated in the seat facing the tree trunk, and a joint device pivotably connecting said handle portion to said mirror for selective adjusting movement of said mirror relative to said handle, wherein said mirror and said joint device are selectively detachable as a unit from said handle portion to facilitate mounting and demounting of said handle portion and said spike as a unit to and from the tree trunk.

2. A rearview mirror apparatus for use by hunters while seated in a tree stand disposed in an elevated disposition on a tree trunk wherein the tree stand has a seat facing the tree trunk, the mirror apparatus comprising a mirror and a mounting arm assembly attached to said mirror, said mounting arm assembly including a threaded spike and a handle portion attached to said spike for driving manual rotational penetration of the tree trunk by said spike and rotational withdrawal from the tree trunk of said spike for selective mounting to and demounting from the tree trunk in a viewing position forwardly of the tree stand seat to provide a hunter with a reflected field of view rearwardly of the seat from a stationary position seated in the seat facing the tree trunk, and a joint device pivotably connecting said handle portion to said mirror for selective adjusting movement of said mirror relative to said handle, wherein said joint device includes a first pivotable joint between said joint device and said handle portion and a second pivotable joint between said joint device and said mirror.

* * * * *